United States Patent
Miyaji

(10) Patent No.: US 10,289,362 B2
(45) Date of Patent: May 14, 2019

(54) IMAGE FORMING APPARATUS

(71) Applicant: KYOCERA Document Solutions Inc., Osaka (JP)

(72) Inventor: Hikaru Miyaji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/010,024

(22) Filed: Jun. 15, 2018

(65) Prior Publication Data
US 2018/0373478 A1    Dec. 27, 2018

(30) Foreign Application Priority Data

Jun. 21, 2017 (JP) ................... 2017-121463

(51) Int. Cl.
G06F 3/12 (2006.01)
G06F 21/36 (2013.01)
G08B 13/196 (2006.01)

(52) U.S. Cl.
CPC .......... G06F 3/1239 (2013.01); G06F 3/1207 (2013.01); G06F 3/1222 (2013.01); G06F 3/1259 (2013.01); G06F 21/36 (2013.01); G08B 13/19682 (2013.01)

(58) Field of Classification Search
USPC ...................................... 358/1.14
See application file for complete search history.

(56) References Cited

U.S. PATENT DOCUMENTS

| 2006/0271789 A1* | 11/2006 | Satomura | G06F 21/41 713/183 |
| 2007/0201926 A1* | 8/2007 | Kato | G06F 3/1208 400/62 |
| 2014/0337445 A1* | 11/2014 | Nishida | H04L 51/28 709/206 |

FOREIGN PATENT DOCUMENTS

JP     2006-205374 A     8/2006

* cited by examiner

Primary Examiner — Neil R McLean
Assistant Examiner — Darryl V Dottin
(74) Attorney, Agent, or Firm — Stein IP, LLC

(57) ABSTRACT

An image forming apparatus includes an operation panel which receives an entry of a password, a control portion which determines whether or not the entry password is correct and a storage portion. The storage portion stores, as an item of information which indicates that the entry password is wrong and which is included in notification information, an item to be notified that is previously set by a user, and when the control portion performs notification processing for notifying the notification information to an outside, the control portion includes, in the notification information, information corresponding to the item to be notified.

14 Claims, 6 Drawing Sheets

IMAGE FORMING APPARATUS

INCORPORATION BY REFERENCE

This application is based upon and claims the benefit of priority from the corresponding Japanese Patent Application No. 2017-121463 filed on Jun. 21, 2017, the entire contents of which are incorporated herein by reference.

BACKGROUND

The present disclosure relates to an image forming apparatus which receives an entry of a password from a user.

Conventionally, an image forming apparatus which incorporates a user authentication function is known. When the conventional image forming apparatus performs printing based on print data in which a password is set, the image forming apparatus receives an entry of a password from a user. Then, when the entered password is correct, the image forming apparatus performs the printing based on the print data in which the password is set whereas when the entered password is wrong, the image forming apparatus does not perform the printing based on the print data in which the password is set.

When the entered password is wrong, the conventional image forming apparatus provides a notification thereof. Specifically, notification information is transmitted to a predetermined address. In this way, a receiver who receives the notification information can find that a third party (suspicious person) may operate the image forming apparatus.

SUMMARY

An image forming apparatus according to an aspect of the present disclosure includes an operation panel, a control portion and a storage portion. The operation panel displays an entry screen so as to receive an entry of a user ID and a password from a user. The control portion recognizes the entry user ID and the entry password entered via the entry screen so as to determine whether or not the entry password is correct. The storage portion stores, as an item of information which indicates that the entry password is wrong and which is included in notification information, an item to be notified that is previously set by the user. When the control portion performs notification processing for notifying the notification information to an outside, the control portion includes, in the notification information, information corresponding to the item to be notified.

DETAILED DESCRIPTION

Apparatus Configuration

Figure 1:
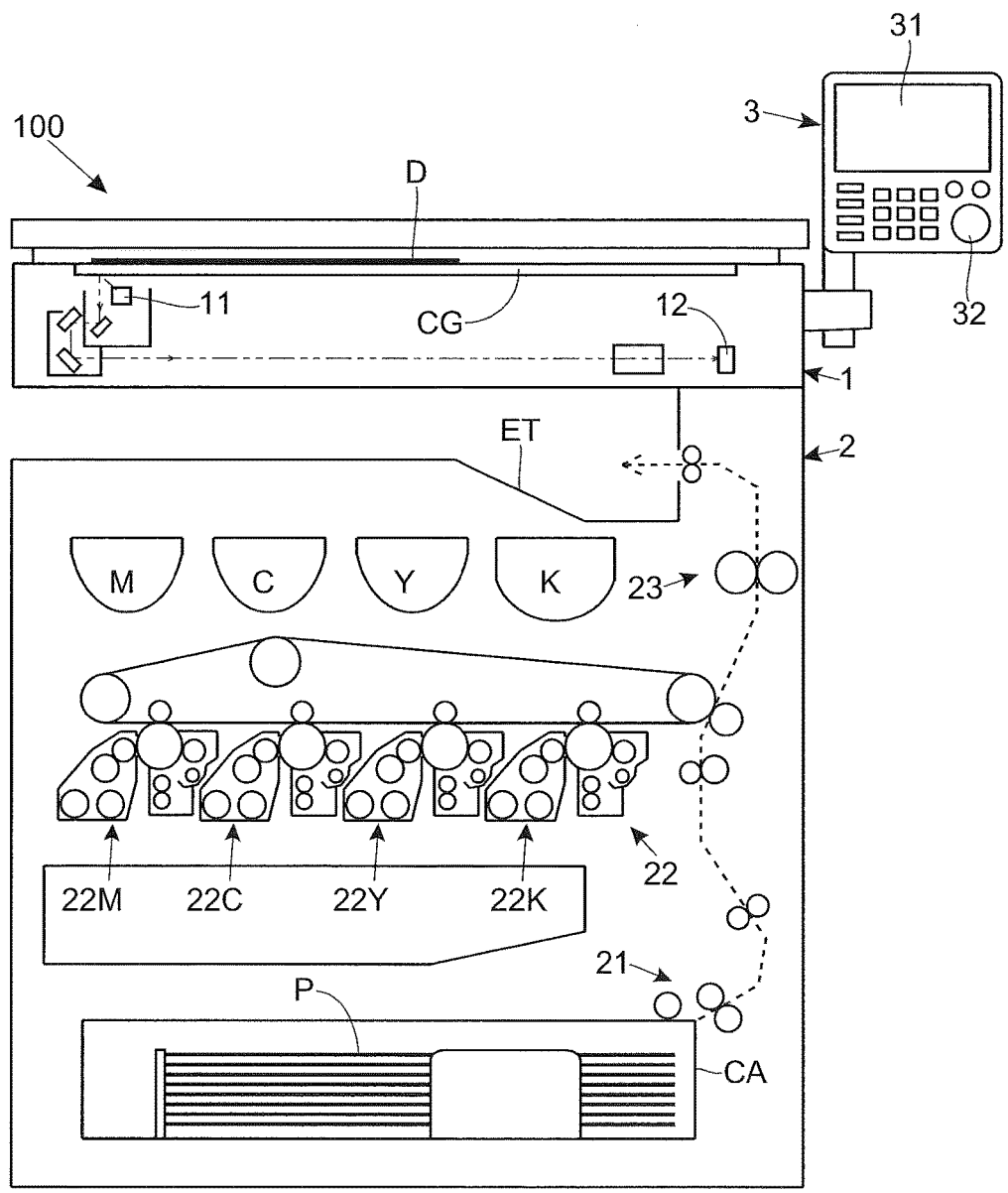
FIG. 1 is a diagram showing the overall configuration of an image forming apparatus according to an embodiment of the present disclosure.

As shown in FIG. 1, the image forming apparatus 100 of the present embodiment includes an image reading portion 1. The image reading portion 1 reads an original document D so as to generate the image data of the original document D. The image reading portion 1 includes optical members, such as a lamp 11 and an image sensor 12, which optically read the original document D. The lamp 11, the image sensor 12 and the like are stored within the housing of the image reading portion 1. On the upper surface of the housing of the image reading portion 1, a contact glass CG is provided. The image reading portion 1 reads the original document D placed on the contact glass CG.

The image forming apparatus 100 also includes a print portion 2. The print portion 2 includes a paper feed portion 21, an image formation portion 22 and a fixing portion 23. The print portion 2 transports a sheet P, prints an image (for example, notification information which will be described later) on the sheet P being transported and ejects the printed sheet P to an ejection tray ET.

The paper feed portion 21 feeds the sheets P stored in a sheet cassette CA to a sheet transport path (indicated by a broken line in FIG. 1). The sheet P fed to the sheet transport path is transported along the sheet transport path.

The image formation portion 22 includes image formation units 22K, 22Y, 22C and 22M which respectively correspond to the individual colors of black (K), yellow (Y), cyan (C) and magenta (M). The image formation units 22K, 22Y, 22C and 22M respectively form the toner images of the corresponding colors so as to primarily transfer them to an intermediate transfer belt. The toner images transferred to the intermediate transfer belt are secondarily transferred to the sheet P being transported.

The fixing portion 23 pressurizes and heats the sheet P to which the toner images are transferred. In this way, the toner images are fixed to the sheet P. The printed sheet P to which the toner images are fixed is transported along the sheet transport path without being processed and is ejected to the ejection tray ET.

The image forming apparatus 100 also includes an operation panel 3. The operation panel 3 includes a touch panel display 31. The touch panel display 31 displays a screen in which software keys, a message and the like are arranged, and receives a touch operation on the displayed screen (software keys) from a user. The operation panel 3 also includes a plurality of hardware keys 32. For example, a start key for receiving an instruction to execute a job from the user is provided as the hardware key 32 in the operation panel 3.

Figure 2:
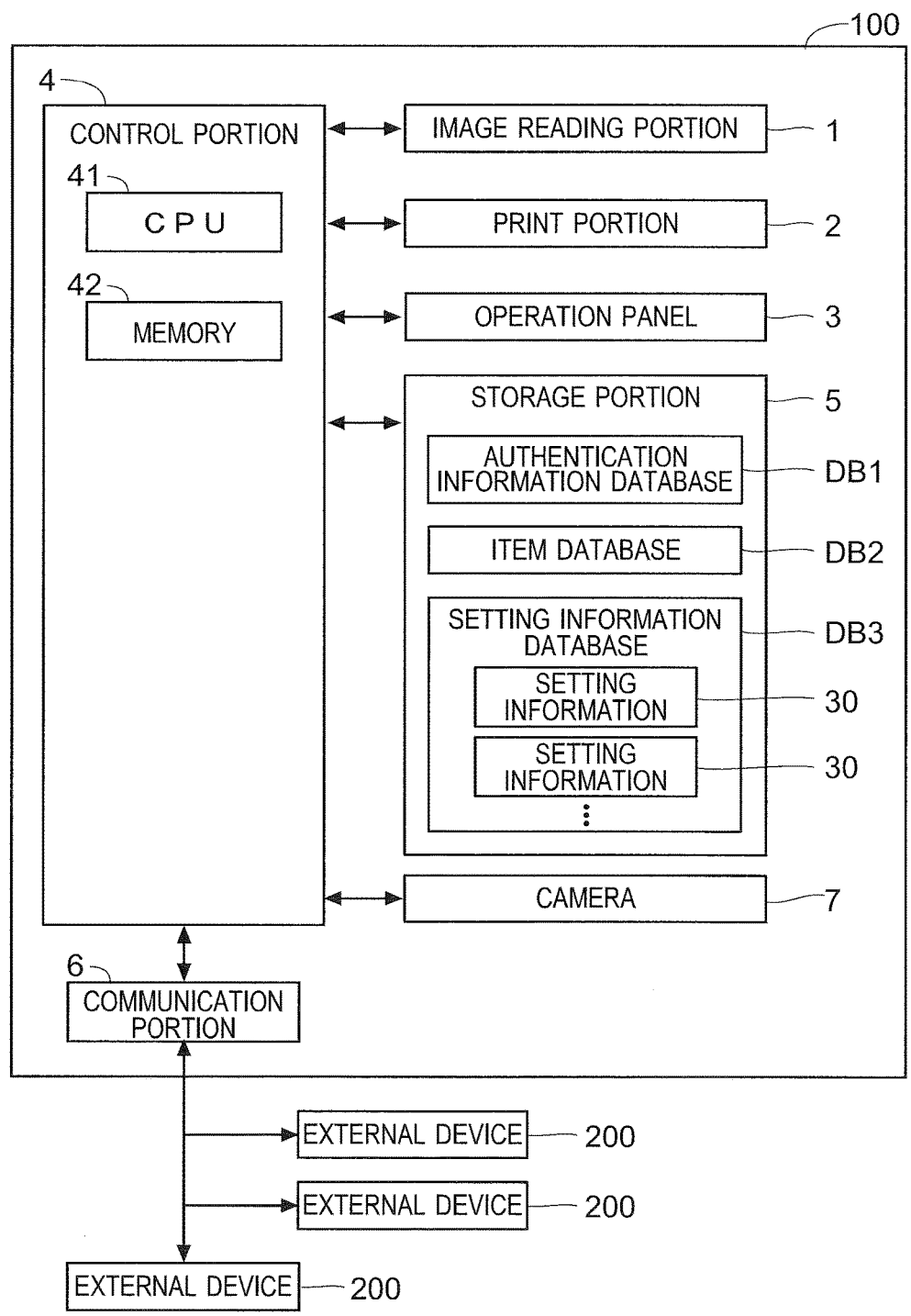
FIG. 2 is a diagram showing the hardware configuration of the image forming apparatus according to the embodiment of the present disclosure.

As shown in FIG. 2, the image forming apparatus 100 also includes a control portion 4. The control portion 4 is connected to the image reading portion 1 so as to control the reading operation of the image reading portion 1. The control portion 4 is also connected to the print portion 2 so as to control the print operation of the print portion 2. Furthermore, the control portion 4 is connected to the operation panel 3. The control portion 4 controls the display operation of the touch panel display 31, and detects the touch operation on the touch panel display 31 (software keys) and a press-down operation on the hardware keys 32.

The control portion 4 includes a CPU 41 and a memory 42. The CPU 41 is operated based on programs and data for control so as to perform processing for controlling the individual portions. The memory 42 stores the programs and data for operating the CPU 41.

The image forming apparatus 100 also includes a storage portion 5. The storage portion 5 includes nonvolatile storage devices such as a ROM (for example, an EPROM) and a HDD. The control portion 4 is connected to the storage portion 5 so as to read data from the storage portion 5 and write data into the storage portion 5.

The image forming apparatus 100 also includes a communication portion 6. The communication portion 6 includes a communication circuit, a communication memory, a communication connector and the like. The communication portion 6 is connected to external devices 200 such that the communication portion 6 can communicate therewith. The control portion 4 is connected to the communication portion 6 so as to communicate with the external devices 200 through the communication portion 6, and transmits and receives various types of information to and from the external devices 200. A user terminal which is used by the user of the image forming apparatus 100 is connected to the image forming apparatus 100 (the communication portion 6) such that the user terminal can communicate therewith. For example, the user terminal is a personal computer (PC). The user terminal may be a portable information terminal (such as a smartphone or a tablet terminal).

The image forming apparatus 100 also includes a camera 7. The camera 7 is installed in such a position that an operator (the face of the operator) who operates the operation panel 3 can be shot. The camera 7 may be installed in the operation panel 3. The camera 7 is controlled by the control portion 4. The control portion 4 analyzes shooting data (the face image data of the operator included in the shooting data) obtained by shooting with the camera 7 so as to determine whether or not the operator is present. A configuration may be adopted in which the camera 7 is not provided in the image forming apparatus 100.

User Authentication

Although a plurality of types of functions are incorporated in the image forming apparatus 100, only an authorized user (user who is authorized to use the image forming apparatus 100) is authorized to use a predetermined function among the functions. A user who desires to use the predetermined function needs to log into the image forming apparatus 100. In other words, the user needs to receive user authentication (identification). As a result of the user authentication, the image forming apparatus 100 has been able to confirm that the user who receives the user authentication is an authorized user, and thus the image forming apparatus 100 authorizes the user to log into it (authorizes the user to use the predetermined function). When the image forming apparatus 100 is in a non-login state, the use of all the functions incorporated in the image forming apparatus 100 may be prohibited.

Although not particularly limited, a function of printing, on the sheet P, an image based on image data stored in the image forming apparatus 100 or the like is set to the predetermined function. On the other hand, a simple copying function or the like can be used even when the image forming apparatus 100 is in the non-login state. When the simple copying function is used to perform printing, the user does not need to receive the user authentication (the user does not need to enter a user ID and a password into a login screen 310 which will be described later). For example, a simple copying screen (unillustrated) for making settings on the simple copying function is prepared. In the simple copying screen, only the settings of specific setting items such as the setting of the number of sheets to be printed and the setting of a sheet size (selection of the sheet cassette CA) are received. In the simple copying function, aggregate copying, double-sided printing and the like cannot be performed.

In the image forming apparatus 100, authentication information necessary for the user authentication is previously registered. The authentication information includes the user ID of the authorized user and the password associated with the user ID, and is stored in an authentication information database DB1 (see FIG. 2). The authentication information database DB1 is stored in the storage portion 5. When a plurality of authorized users are present, a plurality of pieces of authentication information which respectively correspond to the authorized users are stored in the authentication information database DB1.

When the user receives the user authentication, the user enters the user information of the user (the user ID and the password associated with the user ID). The reception of the entry of the user information is performed by the operation panel 3.

Figure 3:
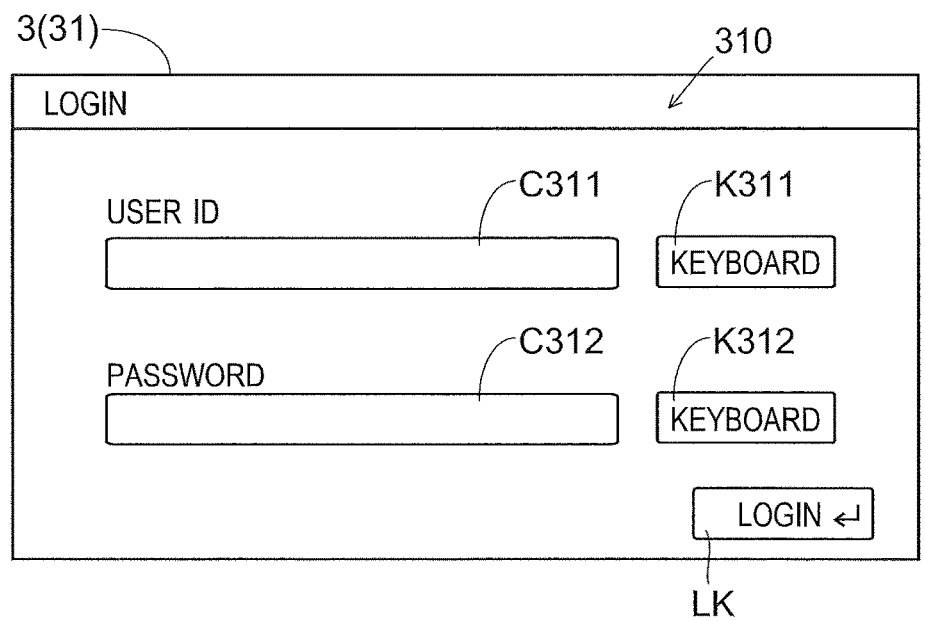
FIG. 3 is a diagram showing a login screen displayed in the image forming apparatus according to the embodiment of the present disclosure.

When the operation panel 3 receives the entry of the user information, the operation panel 3 displays a login screen 310 as shown in FIG. 3. The login screen 310 corresponds to an "entry screen". When the image forming apparatus 100 is in the non-login state, the login screen 310 is displayed as an initial screen on the operation panel 3.

In the login screen 310, entry fields C311 and C312 are arranged. When the user enters the user ID, the operation panel 3 displays the user ID in the entry field C311 whereas when the user enters the password, the operation panel 3 displays the password in the entry field C312.

Figure 4:
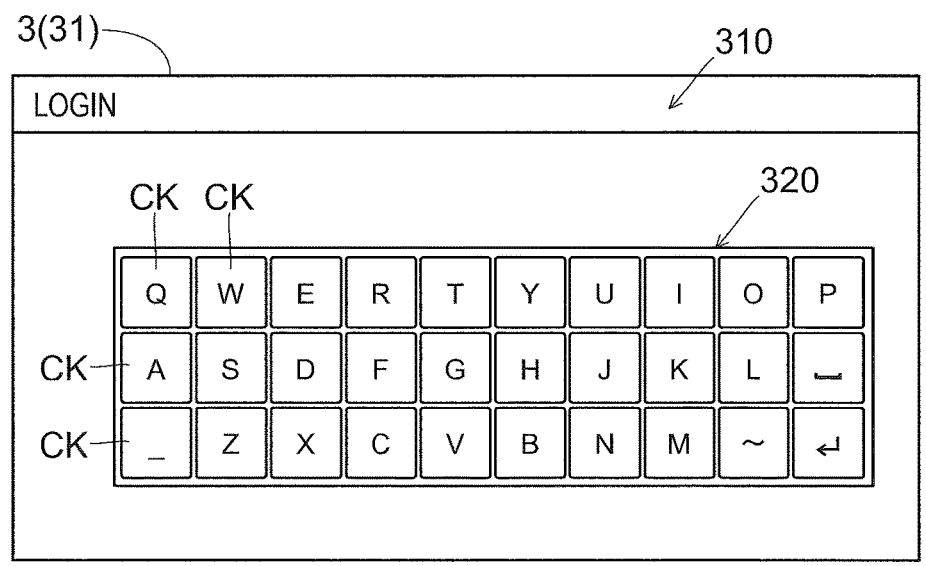
FIG. 4 is a diagram showing a software keyboard displayed in the image forming apparatus according to the embodiment of the present disclosure.

In the login screen 310, keys K311 and K312 are arranged. When the touch operation is performed on the key K311 or K312, the operation panel 3 displays a software keyboard 320 as shown in FIG. 4 in the login screen 310 such that the software keyboard 320 pops up. The software keyboard 320 includes a plurality of character entry keys CK. The software keyboard 320 which is displayed by the touch operation on the key K311 (see FIG. 3) is used for receiving an entry of the user ID as the user information, and the software keyboard 320 which is displayed by the touch operation on the key K312 (see FIG. 3) is used for receiving an entry of the password as the user information. The operation panel 3 receives, from the user, the entry of the user ID or the password character by character. In the software keyboard 320, characters, numbers and symbols can be entered, and these characters, numbers and symbols are collectively referred to as characters.

Furthermore, in the login screen 320 (see FIG. 3) displayed on the operation panel 3, a login key LK is arranged. The login key LK is a key for receiving, from the user, a requirement for performing the user authentication.

When the control portion 4 detects the touch operation on the login key LK, the operation panel 3 determines that the requirement for performing the user authentication is received. Then, the control portion 4 performs the user authentication based on the user information entered into the login screen 310 and the previously registered authentication information. In the following description, the user ID and the password entered into the login screen 310 are respectively referred to as an entry user ID and an entry password, and the user ID and the previously registered password are respectively referred to as a registration user ID and a registration password.

When the control portion 4 performs the user authentication, the control portion 4 compares the user information and the authentication information. Specifically, the control portion 4 recognizes the entry user ID and the entry password, and searches the authentication information database DB1 for the same registration user ID as the entry user ID. When the same registration user ID as the entry user ID is not found, the control portion 4 determines that the requirement user who requires the performance of the user authentication is not an authorized user.

When the same registration user ID as the entry user ID is found, the control portion 4 sets, to an authentication password, the registration password associated with the same registration user ID as the entry user ID. Then, the control portion 4 compares the authentication password and the entry password, and when the authentication password agrees with the entry password, the control portion 4 determines that the entry password is correct. In other words, the control portion 4 determines that the requirement user who requires the performance of the user authentication is an authorized user. In this case, the control portion 4 performs processing for transferring the image forming apparatus 100 to a login state.

When as a result of the comparison of the authentication password and the entry password, the authentication password and the entry password do not agree with each other, the control portion 4 determines that the entry password is wrong. In other words, the control portion 4 determines that the requirement user who requires the performance of the user authentication is not an authorized user. In this case, the image forming apparatus 100 is not transferred to the login state.

For example, when a predetermined threshold time elapses while the image forming apparatus 100 in the login state is not used, the control portion 4 transfers the image forming apparatus 100 from the login state to the non-login state. Here, the image forming apparatus 100 may be transferred from a normal mode to a power-saving mode (sleep mode). Alternatively, when the image forming apparatus 100 is in the login state, the control portion 4 detects that a predetermined operation is performed on the operation panel 3, and thus the control portion 4 transfers the image forming apparatus 100 to the non-login state.

Number of Errors

The control portion 4 counts the number of times the entry password is determined to be wrong (hereinafter, referred to as the number of errors). The count value of the number of errors is stored in the memory 42 of the control portion 4. When the control portion 4 determines that the entry password is wrong, the control portion 4 counts up the count value of the number of errors by one. Each time the control portion 4 determines that the entry password is wrong, the count value of the number of errors is cumulatively increased by one.

The control portion 4 determines whether or not a predetermined reset condition is satisfied, and when the reset condition is satisfied, the control portion 4 resets the count value of the number of errors (the count value of the number of errors after the reset is 0). For example, when the control portion 4 determines that the entry password is correct, the reset condition is determined to be satisfied, and thus the count value of the number of errors is reset.

When a predetermined time (for example, several tens to several hundreds of seconds (for example, about one minute)) elapses after the control portion 4 determines that the entry password is wrong without a reentry of the password into the login screen 310 being performed, the control portion 4 determines that the reset condition is satisfied so as to reset the count value of the number of errors. For example, when a certain user enters a wrong password into the operation panel 3 of the image forming apparatus 100 in the non-login state, the count value of the number of errors is counted up. Thereafter, however, when a predetermined time elapses after the user leaves the installation place of the image forming apparatus 100, the count value of the number of errors is reset.

When the operation panel 3 receives an instruction to switch to a screen (hereinafter, referred to as a specific screen) to which the login screen 310 can be transferred without an entry of the password, the control portion 4 determines that the reset condition is satisfied so as to reset the count value of the number of errors. As an example of the specific screen, the simple copying screen can be mentioned. For example, in the operation panel 3, a simple copying key is provided as the hardware key 32. The simple copying key is a key for displaying the simple copying screen on the operation panel 3. When in a state where the login screen 310 is displayed on the operation panel 3 (with the image forming apparatus 100 in the non-login state), the control portion 4 detects the press-down operation on the simple copying key, regardless of whether or not the user ID and the password are entered into the login screen 310, the control portion 4 transfers the display screen of the operation panel 3 from the login screen 310 to the simple copying screen. Here, the control portion 4 resets the count value of the number of errors.

The control portion 4 also determines, based on the shooting data obtained by the shooting with the camera 7, whether or not the operator (person who operates the operation panel 3) is present. Then, when a state where the operator is present is brought into a state where the operator is not present, the control portion 4 determines that the reset condition is satisfied so as to reset the count value of the number of errors.

Notification Processing

When the control portion 4 determines that the entry password is wrong, the control portion 4 performs notification processing for notifying, to the outside, notification information indicating that the entry password is wrong. However, depending on the count value of the number of errors when the control portion 4 determines that the entry password is wrong, it is likely that the notification processing by the control portion 4 is not performed. The details thereof will be described later.

Details of Notification Information

The details of the notification information will first be described.

A plurality of items of information which can be included in the notification information are present, and the information of an item set (selected) in an item setting performed by the user is included in the notification information. In other words, the item of information to be included in the notification information can be arbitrarily set (selected) by the user. The item setting is received by the operation panel 3 from the user. The item setting can also be performed by the external device 200 which is connected to the image forming apparatus 100 such that the external device 200 can communicate therewith.

For example, three items that are a first item (item on the number of errors), a second item (item on time) and a third item (item on the user ID) are prepared as the item of information which can be included in the notification information, and the user can set (select) a desired item from the first to third items as an item to be notified. Only one item of information may be included in the notification information. Alternatively, a plurality of items of information may be included in the notification information (the individual pieces of information in all the first to third items can be included in the notification information). A configuration may be adopted in which the information of items different from the first to third items (for example, information indicating the number of characters, the type of characters and the like in the entry password currently entered into the login screen 310) can be included in the notification information.

When a plurality of registration user IDs which are previously registered in the image forming apparatus 100 are present, the item setting can be performed for each of the registration user IDs. The item which is set by the user as the item to be notified is stored for each of the registration user IDs in an item database DB2 (see FIG. 2). The item database DB2 is stored in the storage portion 5.

When the control portion 4 performs the notification processing, the control portion 4 recognizes the entry user ID currently entered into the login screen 310 so as to recognize the item to be notified corresponding to the entry user ID. Then, the control portion 4 includes, in the notification information, information corresponding to the item to be notified.

For example, it is assumed that the first item (item on the number of errors) is included in the item to be notified. In this case, when the control portion 4 performs the notification processing, the control portion 4 sets the current count value of the number of errors as the information which needs to be included in the notification information. In this way, the number of errors is included in the notification information, and thus the notification destination user who receives the notification can find the number of errors.

It is assumed that the second item (item on time) is included in the notification information. In this case, when the control portion 4 performs the notification processing, the control portion 4 sets the current time as the information which needs to be included in the notification information. In this way, the time (time when the error occurs) when the control portion 4 determines that the entry password is wrong is included in the notification information, and thus the notification destination user who receives the notification can find the time when the error occurs.

It is assumed that the third item (item on the user ID) is included in the notification information. In this case, when the control portion 4 performs the notification processing, the control portion 4 sets the entry user ID currently entered into the login screen 310 as the information which needs to be included in the notification information. In this way, the entry user ID (user ID when the error occurs) entered into the login screen 310 when the control portion 4 determines that the entry password is wrong is included in the notification information, and thus the notification destination user who receives the notification can find the user ID when the error occurs.

In a case where the camera 7 is installed in the image forming apparatus 100, when the control portion 4 determines that the entry password is wrong, the control portion 4 acquires the shooting data obtained by the shooting with the camera 7 (shooting data when the error occurs). Then, the control portion 4 includes, in the notification information, the shooting data when the error occurs. The shooting data when the error occurs includes the face image data of the operator who enters the wrong password into the login screen 310.

The shooting data when the error occurs may be included in the notification information or may not be included therein. For example, when the image forming apparatus 100 is installed in commercial facilities or the like, no shooting is performed with the camera 7. When the shooting data when the error occurs is included in the notification information, blurring processing, filling processing or the like is performed on the background region of the shooting data.

Notification Destination of Notification Information

The notification destination of the notification information will then be described.

As the notification processing, the control portion 4 performs any one of first processing, second processing and third processing. Processing different from the first to third processing may be performed as the notification processing by the control portion 4. For example, processing for displaying, on the operation panel 3, the notification screen in which the notification information is arranged may be performed as the notification processing by the control portion 4. By installation of a sound output portion including a speaker or the like in the image forming apparatus 100, processing in which a warning sound is output from the sound output portion may be performed by the control portion 4 together with the notification processing.

When the control portion 4 performs the first processing, the control portion 4 recognizes an address which is associated with the entry user ID currently entered into the login screen 310. For example, when the authentication information (the user ID and the password) is registered in the image forming apparatus 100, since the user is required to register an address which is associated with the user ID, the user registers, together with the authentication information, the address of the external device 200 (for example, a PC) which is used by the user and which can communicate with the image forming apparatus 100. The address is associated with the user ID and is stored in the authentication information database DB1. In this way, the address recognized by the control portion 4 is the address of the external device 200 which is used by the user corresponding to the entry user ID.

When the control portion 4 recognizes the address associated with the entry user ID, the control portion 4 makes the communication portion 6 transmit the notification information to the address associated with the entry user ID. In this way, the external device 200 which is used by the user corresponding to the entry user ID receives the notification information. The display of the external device 200 receiving the notification information displays the notification information. In other words, the notification information is notified to the user corresponding to the entry user ID (this user is the notification destination of the notification information).

When the control portion 4 performs the second processing, the control portion 4 recognizes, as a notification destination address, a previously registered address (address other than the address associated with the entry user ID). For example, the address of the external device 200 (for example, a PC) which is used by a management user who manages the image forming apparatus 100 is previously registered. A plurality of (at least two) addresses which can be the notification destination address are registered, and priorities are assigned to the registration addresses which are registered.

When the address associated with the entry user ID is different from each of the registration addresses or when the address associated with the entry user ID is different from the registration address which has the highest priority, the control portion 4 recognizes, as the notification destination address, the registration address having the highest priority among the registration addresses. When the address associated with the entry user ID is the same as the registration address having the highest priority, the control portion 4 recognizes, as the notification destination address, the registration address having the second highest priority. Among the registration addresses, all the registration addresses different from the address associated with the entry user ID may be recognized as the notification destination addresses by the control portion 4.

When the control portion 4 recognizes any one of the registration addresses as the notification destination address, the control portion 4 makes the communication portion 6 transmit the notification information to the notification destination address (registration address). In this way, the notification information is displayed on the display of the external device 200 corresponding to the notification destination address. In other words, the notification information is notified to the user who uses the external device 200 (this user is the notification destination of the notification information).

When the control portion 4 performs the third processing, the control portion 4 provides a print command to the print portion 2 so as to make the print portion 2 print the notification information on the sheet P. The print portion 2 which receives the print command from the control portion 4 prints the notification information on the sheet P and ejects, to the outside, the sheet P on which the notification information is printed (ejects it to the ejection tray ET). In this way, the notification information is notified to the person who currently operates the operation panel 3 in the image forming apparatus 100 and the user who is present around the image forming apparatus 100. For example, when the person who currently operates the image forming apparatus 100 is a third party (suspicious person) who performs unauthorized access to the image forming apparatus 100, the notification information is printed on the sheet P and is ejected, and thus it is possible to make the third party recognize that monitoring on unauthorized access is performed (it is possible to make the third party abandon the unauthorized access).

The control portion 4 makes the print portion 2 repeatedly print the notification information on the sheets P until a predetermined completion condition is satisfied. In this way, a large number of sheets P on which the notification information is printed are continuously ejected from the image forming apparatus 100. In other words, the image forming apparatus 100 continues to eject the sheets P for a long period of time. The image forming apparatus 100 continues to eject the sheets P for a long period of time, and thus it is possible to make the user around the image forming apparatus 100 think that an abnormality occurs in the image forming apparatus 100, with the result that attention is focused on the image forming apparatus 100. In this way, when the third party attempts to perform unauthorized access to the image forming apparatus 100, it is possible to reliably make the third party abandon the unauthorized access.

For example, a sheet remaining amount sensor for detecting a sheet remaining amount stored in the sheet cassette CA is installed in the image forming apparatus 100. The output value of the sheet remaining amount sensor is changed according to the sheet remaining amount stored in the sheet cassette CA. The control portion 4 detects the sheet remaining amount based on the output value of the sheet remaining amount sensor, and when the control portion 4 detects that the sheets P run out from the sheet cassette CA, the control portion 4 determines that the completion condition is satisfied. Alternatively, when the number of sheets printed after the start of printing of the notification information reaches a predetermined number of sheets (for example, several tens of sheets), the control portion 4 may determine that the completion condition is satisfied. In a case where the camera 7 is installed in the image forming apparatus 100, when a state where the operator is present is brought into a state where the operator is not present, regardless of the sheet remaining amount and the number of sheets printed, the control portion 4 determines that the completion condition is satisfied.

Here, the storage portion 5 stores setting information 30 in which whether or not the notification processing is performed and which one of the types of notification processing (the first to third processing) is performed when the notification processing is performed are previously set by the user for each count value of the number of errors. The setting (registration) of the setting information 30 is received by operation panel 3 from the user. Alternatively, the setting (registration) of the setting information 30 can be performed by the external device 200 which is connected to the image forming apparatus 100 such that the external device 200 can communicate therewith.

When a plurality of registration user IDs previously registered in the image forming apparatus 100 are present, the setting (registration) of the setting information 30 can be performed for each of the registration user IDs. The setting information 30 set by the user is stored in a setting information database DB3 (see FIG. 2) for each of the registration user IDs. The setting information database DB3 is stored in the storage portion 5.

Figure 5:
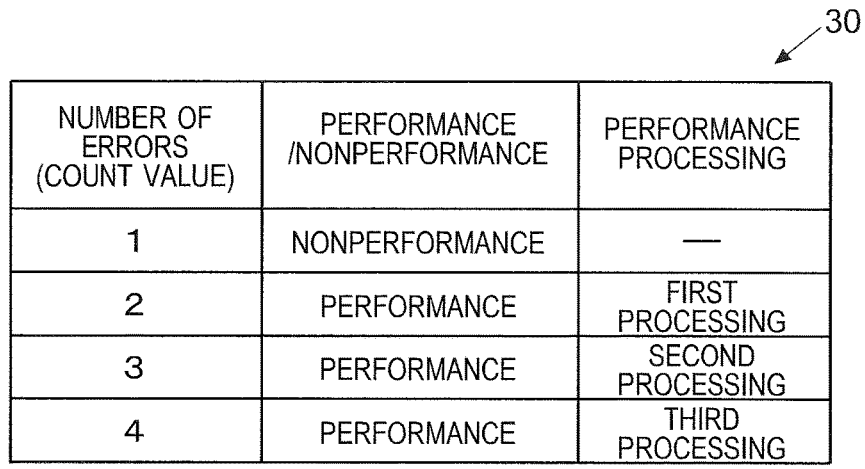
FIG. 5 is a diagram for illustrating setting information stored in the image forming apparatus according to the embodiment of the present disclosure.

FIG. 5 shows an example of the setting information 30. In the example shown in FIG. 5, the setting of performance/nonperformance corresponding to the count value of "1" is "nonperformance", and the settings of performance/nonperformance corresponding to the count values of "2", "3" and "4" are "performance". The setting of performance processing corresponding to the count value of "2" is the "first processing", the setting of the performance processing corresponding to the count value of "3" is the "second processing" and the setting of the performance processing corresponding to the count value of "4" is the "third processing".

In the example shown in FIG. 5, when the control portion 4 determines that the entry password is wrong, and the count value of the number of errors is "1", the control portion 4 does not perform the notification processing whereas when the count value of the number of errors is any one of "2", "3" and "4", the control portion 4 performs the notification processing.

When the count value of the number of errors is "2", the control portion 4 performs the first processing, when the count value of the number of errors is "3", the control portion 4 performs the second processing and when the count value of the number of errors is "4", the control portion 4 performs the third processing. When the control portion 4 performs any one of the first to third processing, the control portion 4 recognizes the entry user ID currently entered in the login screen 310. Based on the information stored in the item database DB2, the control portion 4 recognizes the item to be notified corresponding to the recognized entry user ID. Then, the control portion 4 includes, in the notification information, the information corresponding to the item to be notified which is recognized.

Flow of Notification Processing

Figure 6:
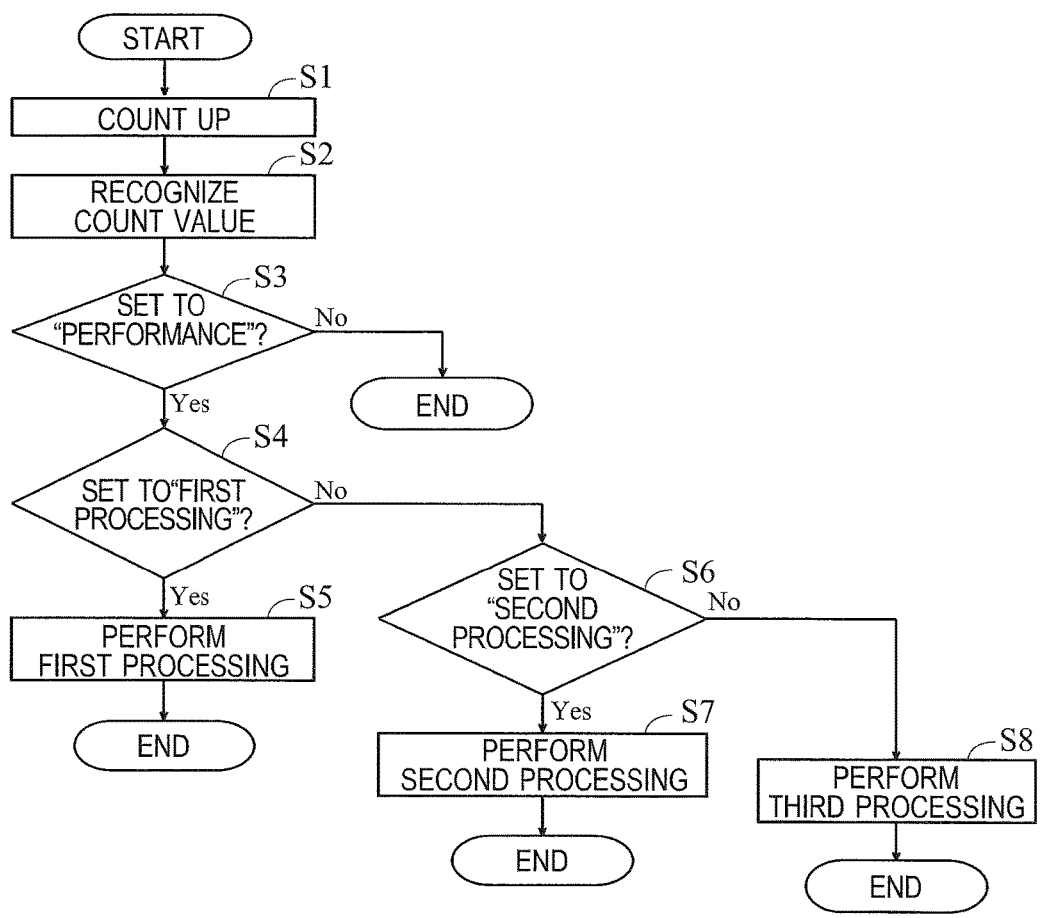
FIG. 6 is a flowchart showing the flow of notification processing performed in the image forming apparatus according to the embodiment of the present disclosure.

The flow of the notification processing performed by the control portion 4 will be described below with reference to a flowchart shown in FIG. 6. The start of the flowchart shown in FIG. 6 is the time when the control portion 4 determines that the entry password is wrong (when the user fails to log into the image forming apparatus 100).

For example, when the control portion 4 determines that the entry password is wrong, the control portion 4 recognizes the entry user ID currently entered into the login screen 310. Then, based on the information stored in the authentication information database DB1, the control portion 4 recognizes the address of the external device 200 used by the user corresponding to the entry user ID (in the following description, referred to as the address of the entry user ID). Based on the information stored in the item database DB2, the control portion 4 also recognizes the item to be notified which is associated with the entry user ID. Furthermore, the control portion 4 extracts the setting information 30 corresponding to the entry user ID from the setting information database DB3.

In step S1, the control portion 4 counts up the count value of the number of errors. In step S2, the control portion 4 recognizes the current count value of the number of errors (the count value after being counted up).

In step S3, the control portion 4 recognizes, based on the setting information 30 corresponding to the entry user ID, the details of the setting of performance/nonperformance associated with the current count value of the number of errors. Then, the control portion 4 determines whether or not the recognized setting of performance/nonperformance is set to "performance". Consequently, when the control portion 4 determines that the setting of performance/nonperformance is set to "performance", the process is transferred to step S4. In other words, when the control portion 4 determines that the notification processing needs to be performed, the process is transferred to step S4. In the example shown in FIG. 5, when the current count value of the number of errors is any one of "2" to "4", the process is transferred to step S4.

In step S3, the control portion 4 determines that the setting of performance/nonperformance is set to "nonperformance", the present flow is completed. When the setting of performance/nonperformance is set to "nonperformance", the notification processing is not performed by the control portion 4 at present. In other words, the control portion 4 determines that the notification processing does not need to be performed. In the example shown in FIG. 5, when the current count value of the number of errors is "1", the present flow is completed.

When the process is transferred to step S4, the control portion 4 recognizes, based on the setting information 30 corresponding to the entry user ID, the details of the setting of the performance processing associated with the current count value of the number of errors. Then, the control portion 4 determines whether or not the recognized setting of the performance processing is set to the "first processing". Consequently, when the control portion 4 determines that the setting of the performance processing is set to the "first processing", the process is transferred to step S5. In the example shown in FIG. 5, when the current count value of the number of errors is "2", the process is transferred to step S5.

When the process is transferred to step S5, the control portion 4 performs the first processing. Specifically, the control portion 4 makes the communication portion 6 transmit the notification information (the notification information includes the information of the item to be notified associated with the entry user ID) to the address of the entry user ID.

When in step S4, the control portion 4 determines that the setting of the performance processing is not set to the "first processing", the process is transferred to step S6. When the process is transferred to step S6, the control portion 4 determines whether or not the setting of the performance processing is set to the "second processing". Consequently, when the control portion 4 determines that the setting of the performance processing is set to the "second processing", the process is transferred to step S7. In the example shown in FIG. 5, when the current count value of the number of errors is "3", the process is transferred to step S7.

When the process is transferred to step S7, the control portion 4 performs the second processing. Specifically, the control portion 4 makes the communication portion 6 transmit the notification information (the notification information includes the information of the item to be notified associated with the entry user ID) to an address different from the address of the entry user ID among the registration addresses.

When in step S6, the control portion 4 determines that the setting of the performance processing is not set to the "second processing", the process is transferred to step S8. The fact that the setting of the performance processing is not set to the "second processing" means that the setting of the performance processing is set to the "third processing". In the example shown in FIG. 5, when the current count value of the number of errors is "4", the process is transferred to step S8.

When the process is transferred to step S8, the control portion 4 performs the third processing. Specifically, the control portion 4 makes the print portion 2 print, on the sheet P, the notification information (the notification information includes the information of the item to be notified associated with the entry user ID).

The image forming apparatus 100 of the present embodiment includes, as described above, the operation panel 3 which displays the login screen 310 (entry screen) so as to receive an entry of the user ID and the password from the user; the control portion 4 which recognizes the entry user ID and the entry password entered into the login screen 310 so as to determine whether or not the entry password is correct; and the storage portion 5. The storage portion 5 stores, as an item of information which indicates that the entry password is wrong and which is included in the notification information, an item to be notified that is previously set by the user. When the control portion 4 performs the notification processing for notifying the notification information to the outside, the control portion 4 includes, in the notification information, only information corresponding to the item to be notified and does not include the other information in the notification information.

In the configuration of the present embodiment, the information corresponding to the item to be notified is included in the notification information. Here, the item to be notified is the item which is previously set by the user. In other words, only the information corresponding to the item previously set by the user is included in the notification information received by the user. In this way, it is possible to reduce the occurrence of a failure in which the notification information that does not include the information necessary for the user is notified to the user. It is also possible to reduce the occurrence of a failure in which the notification information that includes information unnecessary for the user is notified to the user. Consequently, the convenience of the user who receives the notification information is enhanced.

In the present embodiment, as described above, whether or not the notification processing is performed and which one of the first to third processing is performed as the notification processing when the notification processing is performed can be arbitrarily set by the user for each count value of the number of errors, and thus the convenience of the user is more enhanced.

For example, even when the user who enters the password is an authorized user, a simple entry error can occur. Each time a simple entry error occurs, the notification information is notified, and thus the user who receives the notification information feels annoying. In order to reduce such a failure, the user can arbitrarily set the setting information 30. For example, as in the example shown in FIG. 5, the setting of performance/nonperformance associated with the count value of "1" in the number of errors is set to "nonperformance", and thus even when a simple entry error occurs in the first entry of the password, the notification information is prevented from being notified. As will be described later, when even one password entry error occurs, an entry error prevention function is enabled. Hence, it is possible to reduce the continuous occurrence of simple entry errors.

When password entry errors continuously occur, a third party (suspicious person) may perform unauthorized access to the image forming apparatus 100. In this case, as in the example shown in FIG. 5, the setting of performance/nonperformance associated with the count values of "2" to "4" in the number of errors is set to "performance", and thus the notification information is notified when entry errors continuously occur (when the control portion 4 determines that the entry password is wrong), with the result that it is possible to previously prevent unauthorized access.

The notification destination of the notification information when a password entry error occurs can be changed according to the number of entry errors (the count value of the number of errors), and thus for example, it is possible to notify the notification information to the management user of the image forming apparatus 100 when a large number of entry errors occur (when there is a high possibility that unauthorized access is performed). In this way, when there is a high possibility that unauthorized access is performed, it is possible to quickly notify the information thereof to the management user of the image forming apparatus 100.

When the control portion 4 determines that the entry password is correct (when the user successfully logs into the image forming apparatus 100), processing similar to the notification processing (hereinafter, referred to as notification processing on success) may be performed by the control portion 4.

Specifically, when the control portion 4 determines that the entry password is correct, if within a monitoring period which is a period that elapses after the previous reset of the count value of the number of errors until this determination that the entry password is correct is made, the control portion 4 determines that the entry password is wrong, the notification processing on success is performed. When the notification processing on success is performed by the control portion 4, predetermined information is notified to the outside. Whether or not the performance of the notification processing on success by the control portion 4 is allowed can be arbitrarily selected by the user.

Although there is no particular limitation, the control portion 4 includes, in the predetermined information, at least one of information indicating the count value of the number of errors counted within the monitoring period, information indicating the time when the entry password is determined to be wrong within the monitoring period and information indicating an entry user ID entered into the login screen 310 when the entry password is determined to be wrong within the monitoring period. The control portion 4 transmits, through the communication portion 6, the predetermined information to the address of the entry user ID. Alternatively, the control portion 4 may transmit the predetermined information to an address different from the address of the entry user ID (for example, the address of the external device 200 used by the management user of the image forming apparatus 100).

Prevention of Password Entry Error

When the control portion 4 determines that the entry password is wrong, the control portion 4 makes the operation panel 3 perform entry error prevention processing for preventing a password entry error when an entry of characters into the login screen 310 is received after the determination described above (when a reentry of the password is received). In other words, when the user enters a wrong password into the login screen 310, the entry error prevention function is automatically enabled (the operation panel 3 performs the entry error prevention processing). When in a state where the entry error prevention function is enabled, the user enters a correct password into the login screen 310, the entry error prevention function is automatically disabled.

When the control portion 4 determines that the entry password is wrong so as to make the operation panel 3 receive a reentry of the password, the control portion 4 makes the operation panel 3 perform, as the entry error prevention processing, at least one of first prevention processing, second prevention processing, third prevention processing and fourth prevention processing. All the first to fourth prevention processing may be performed.

Figure 7:
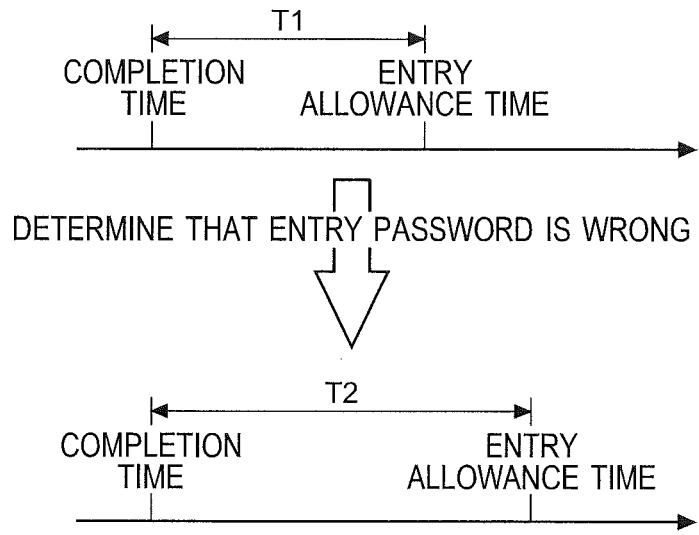
FIG. 7 is a diagram for illustrating entry error prevention processing (first prevention processing) performed in the image forming apparatus according to the embodiment of the present disclosure.

The operation panel 3 performs, as the first prevention processing, processing for changing an entry interval (time interval) of the character entry keys CK. For example, as shown in the upper diagram of FIG. 7, by default, a time T1 which elapses after the completion of an entry of the preceding character until an entry allowance time when an entry of the subsequent character is allowed is set to a predetermined reference time. Then, in the configuration in which the operation panel 3 performs the first prevention processing, when the user enters a wrong password into the login screen 310, as shown in the lower diagram of FIG. 7, the time after the completion until the entry allowance time is set to a time T2 which is longer than the time T1 (reference time). In this way, even when a double touch operation (operation of rapidly touching the same place twice) is unintentionally performed on a certain character entry key CK, the second touch operation is disabled, and thus a character corresponding to this character entry key CK is prevented from being continuously entered.

Figure 8:
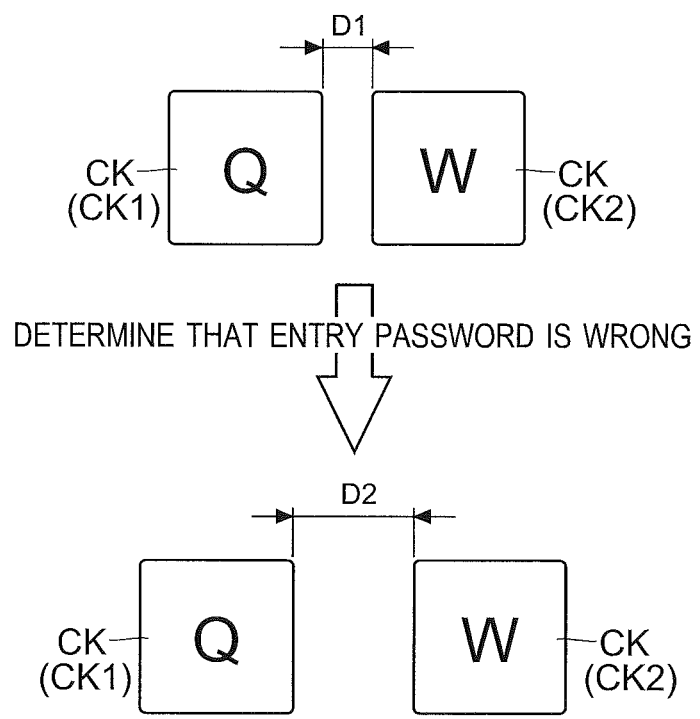
FIG. 8 is a diagram for illustrating entry error prevention processing (second prevention processing) performed in the image forming apparatus according to the embodiment of the present disclosure.

The operation panel 3 performs, as the second prevention processing, processing for changing the intervals (distance intervals) of the individual character entry keys CK. For example, as shown in the upper diagram of FIG. 8, by default, an interval D1 between one character entry key CK1 and the other character entry key CK2 which are adjacent to each other is set to a predetermined reference interval. Then, in the configuration in which the operation panel 3 performs the second prevention processing, when the user enters a wrong password into the login screen 310, as shown in the lower diagram of FIG. 8, the interval between the character entry key CK1 and the character entry key CK2 is set to an interval D2 which is greater than the interval D1 (reference interval). Although not shown in the figure, not only the interval in a lateral direction but also an interval in a vertical direction is also increased. In this way, it is possible to reduce the simultaneous performance of a touch operation on the character entry keys CK1 and CK2.

Figure 9:
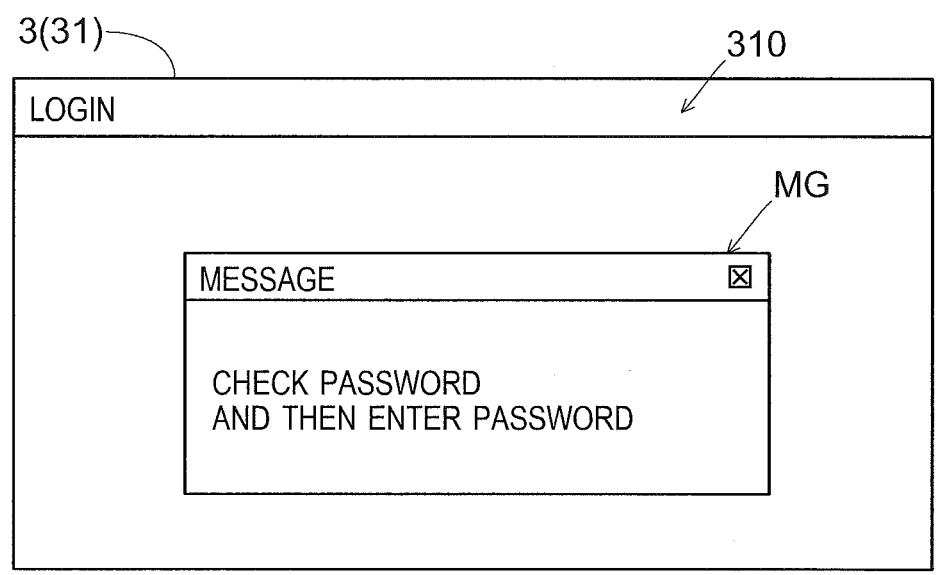
FIG. 9 is a diagram for illustrating entry error prevention processing (third prevention processing) performed in the image forming apparatus according to the embodiment of the present disclosure.

The operation panel 3 performs, as the third prevention processing, processing for displaying a message. For example, when the control portion 4 determines that the entry password is wrong (when a reentry of the entry password is received), the operation panel 3 displays a warning message MG as shown in FIG. 9 in the login screen 310 such that the warning message MG pops up. The warning message MG is set as a message for prompting the user to check the password. In this way, when a reentry of the password is received, it is possible to make the user check the password.

The operation panel 3 performs, as the fourth prevention processing, processing for changing the background image (for example, the colors and patterns of the background) of the login screen 310. For example, each time one character is entered into an entry field 312 in the login screen 310, the control portion 4 determines whether or not the entered character is correct. Then, when the control portion 4 determines that the entered character is correct, the control portion 4 makes the operation panel 3 perform, as the fourth prevention processing, processing for switching the background image of the login screen 310 from the current image to a predetermined correct image. On the other hand, when the control portion 4 determines that the entered character is wrong, the control portion 4 makes the operation panel 3 perform, as the fourth prevention processing, processing for switching the background image of the login screen 310 from the current image to an image (incorrect image) different from the correct image. In this way, when the user who attempts to enter the password is an authorized user, it is possible to make the user recognize whether or not the entered character is wrong. Even when a third party enters the character, though the background image of the login screen 310 is switched, the third party cannot determine whether or not the entered character is wrong.

The image data of the correct image is previously registered by the user. When a plurality of registration user IDs are previously registered in the image forming apparatus 100, the image data of the correct image is registered for each of the registration user IDs. A plurality of pieces of image data of incorrect images are present and are previously registered by a maker. Then, when the control portion 4 determines that the entered character is correct, the control portion 4 recognizes the correct image corresponding to the entry user ID currently entered into the login screen 310 so as to make the operation panel 3 display the recognized correct image. When the control portion 4 determines that the entered character is wrong, the control portion 4 selects any one of a plurality of incorrect images so as to make the operation panel 3 display the selected incorrect image.

In the configuration in which the operation panel 3 performs at least one of the first to fourth prevention processing, when the user reenters the password into the login screen 310 after entering a wrong password into the login screen 310 (after failing to log into the image forming apparatus 100 once), the entry error prevention processing is performed by the operation panel 3, with the result that it is possible to reduce the making of password entry errors many times by the user.

The embodiment disclosed here should be considered to be illustrative in all respects and not restrictive. The scope of the present disclosure is indicated not by the description of the embodiment discussed above but by the scope of claims, and furthermore, meanings equivalent to the scope of claims and all modifications within the scope are included.

What is claimed is:

1. An image forming apparatus comprising:
an operation panel which displays an entry screen so as to receive an entry of a user ID and a password from a user;
a control portion which recognizes the entry user ID and the entry password entered via the entry screen so as to determine whether or not the entry password is correct; and
a storage portion;
wherein the storage portion stores, as an item of information which indicates that the entry password is wrong and which is included in notification information, an item to be notified that is previously set by the user,
when the control portion performs notification processing for notifying the notification information to an outside, the control portion includes, in the notification information, information corresponding to the item to be notified,
wherein a plurality of types of the notification processing are present,
when the control portion determines that the entry password is wrong, the control portion counts up a count value of a number of errors, and when a predetermined reset condition is satisfied, the control portion resets the count value of the number of errors,
the storage portion stores setting information in which whether or not the notification processing is performed and which one of the types of the notification processing is performed when the notification processing is performed are previously set by the user for each count value of the number of errors, and
when the control portion determines that the entry password is wrong, the control portion determines, based on the current count value of the number of errors and the setting information, whether or not the notification processing needs to be performed, and when the control portion determines that the notification processing needs to be performed, the control portion performs the notification processing corresponding to the current count value of the number of errors among the types of the notification processing.

2. The image forming apparatus according to claim 1, further comprising:
a communication portion for communicating with the outside,
wherein one of the types of the notification processing is first processing, and
when the control portion performs the first processing, the control portion recognizes an address associated with the entry user ID currently entered into the entry screen so as to make the communication portion transmit the notification information to the recognized address.

3. The image forming apparatus according to claim 1, further comprising:
a communication portion for communicating with the outside,
wherein one of the types of the notification processing is second processing, and
when the control portion performs the second processing, the control portion recognizes, among a plurality of previously registered addresses, an address different from an address associated with the entry user ID currently entered into the entry screen so as to make the communication portion transmit the notification information to the recognized address.

4. The image forming apparatus according to claim 1, further comprising:
a print portion which transports a sheet, prints the sheet being transported and ejects the sheet,
wherein one of the types of the notification processing is third processing, and
when the control portion performs the third processing, the control portion provides a print command to the print portion so as to make the print portion print the notification information on the sheet.

5. The image forming apparatus according to claim 4, wherein the control portion makes the print portion repeatedly print the notification information on the sheet until a predetermined completion condition is satisfied.

6. An image forming apparatus comprising:
an operation panel which displays an entry screen so as to receive an entry of a user ID and a password from a user;
a control portion which recognizes the entry user ID and the entry password entered via the entry screen so as to determine whether or not the entry password is correct; and
a storage portion;
wherein the storage portion stores, as an item of information which indicates that the entry password is wrong and which is included in notification information, an item to be notified that is previously set by the user,
when the control portion performs notification processing for notifying the notification information to an outside, the control portion includes, in the notification information, information corresponding to the item to be notified,
wherein when the control portion determines that the entry password is wrong, the control portion counts up a count value of a number of errors, and when a predetermined reset condition is satisfied, the control portion resets the count value of the number of errors, and
when a first item is included in the item to be notified, and the control portion performs the notification processing, the control portion includes, as information corresponding to the first item, the current count value of the number of errors in the notification information.

7. The image forming apparatus according to claim 1, wherein when a second item is included in the item to be notified, and the control portion performs the notification processing, the control portion includes, as information corresponding to the second item, a current time in the notification information.

8. The image forming apparatus according to claim 1, wherein when a third item is included in the item to be notified, and the control portion performs the notification processing, the control portion includes, as information corresponding to the third item, the entry user ID currently entered into the entry screen in the notification information.

9. An image forming apparatus comprising:
an operation panel which displays an entry screen so as to receive an entry of a user ID and a password from a user;
a control portion which recognizes the entry user ID and the entry password entered via the entry screen so as to determine whether or not the entry password is correct; and
a storage portion;
wherein the storage portion stores, as an item of information which indicates that the entry password is wrong and which is included in notification information, an item to be notified that is previously set by the user,
when the control portion performs notification processing for notifying the notification information to an outside, the control portion includes, in the notification information, information corresponding to the item to be notified,
wherein when the control portion determines that the entry password is wrong, the control portion counts up a count value of a number of errors, and when a predetermined reset condition is satisfied, the control portion resets the count value of the number of errors, and
when the control portion determines that the entry password is correct, if within a period which elapses after previous reset of the count value of the number of errors until the determination that the entry password is correct is made, the control portion determines that the entry password is wrong, the control portion performs processing for notifying, to the outside, at least one of information indicating the count value of the number of errors counted within the period, information indicating a time when the entry password is determined to be wrong within the period and information indicating the entry user ID entered into the entry screen when the entry password is determined to be wrong within the period.

10. The image forming apparatus according to claim 1, wherein the operation panel displays a plurality of character entry keys for entering characters into the entry screen and receives the entry of the password character by character, and
when the control portion determines that the entry password is wrong so as to make the operation panel receive a reentry of the password, the control portion makes the operation panel perform processing for setting a time which elapses after completion of an entry of a preceding character until an entry of a subsequent character is allowed longer than a predetermined reference time.

11. The image forming apparatus according to claim 1, wherein the operation panel displays a plurality of character entry keys for entering characters into the entry screen and receives the entry of the password character by character, and when the control portion determines that the entry password is wrong so as to make the operation panel receive a reentry of the password, the control portion makes the operation panel perform processing for setting an interval between one of the character entry keys and the other character entry key which are adjacent to each other greater than a predetermined reference interval.

12. The image forming apparatus according to claim 1, wherein when the control portion determines that the entry password is wrong, the control portion makes the operation panel display a message for prompting the user to check the password.

13. The image forming apparatus according to claim 1, wherein the operation panel displays a plurality of character entry keys for entering characters into the entry screen and receives the entry of the password character by character, and each time the character for the password is entered into the entry screen, the control portion determines whether or not the entered character is correct, and when the control portion determines that the entered character is correct, the control portion makes the operation panel perform processing for switching a background image of the entry screen to a predetermined correct image whereas when the control portion determines that the entered character is wrong, the control portion makes the operation panel perform processing for switching the background image of the entry screen to an image different from the correct image.

14. An image forming apparatus comprising:

an operation panel which displays an entry screen so as to receive an entry of a user ID and a password from a user;

a control portion which recognizes the entry user ID and the entry password entered via the entry screen so as to determine whether or not the entry password is correct; and a storage portion;

wherein the storage portion stores, as an item of information which indicates that the entry password is wrong and which is included in notification information, an item to be notified that is previously set by the user, when the control portion performs notification processing for notifying the notification information to an outside, the control portion includes, in the notification information, information corresponding to the item to be notified, a camera which shoots an operator who operates the operation panel, wherein when the control portion determines that the entry password is wrong, the control portion includes, in the notification information, shooting data obtained by the shooting with the camera.

* * * * *